United States Patent [19]

Cluzel

[11] Patent Number: 5,772,810
[45] Date of Patent: Jun. 30, 1998

[54] RADIAL TIRE WITH TRIANGULATED CROWN REINFORCEMENT

[75] Inventor: Guy Cluzel, Beaumont, France

[73] Assignee: Compagnie Generale des Etablisse-Ments Michelin - Michelin & Cie, Clermont-Ferrand Cedex, France

[21] Appl. No.: 718,324

[22] PCT Filed: Jan. 30, 1996

[86] PCT No.: PCT/EP96/00347

§ 371 Date: Sep. 25, 1996

§ 102(e) Date: Sep. 25, 1996

[87] PCT Pub. No.: WO96/25297

PCT Pub. Date: Aug. 22, 1996

[30] Foreign Application Priority Data

Feb. 13, 1995 [FR] France ................................. 95 01705

[51] Int. Cl.[6] .............................. B60C 9/18; B60C 9/20; B60C 9/22

[52] U.S. Cl. ........................ 152/531; 152/526; 152/532; 152/534; 152/535

[58] Field of Search ............................. 152/534, 531, 152/532, 526, 535

[56] References Cited

U.S. PATENT DOCUMENTS 4,696,335  9/1987  Tsukagoshi et al. .

FOREIGN PATENT DOCUMENTS 3327670  2/1985  Germany .
1483053  8/1977  United Kingdom ................... 152/534

*Primary Examiner*—Adrienne C. Johnstone
*Attorney, Agent, or Firm*—Baker & Botts, L.L.P.

[57] ABSTRACT

In the crown reinforcement (2) of a "heavy vehicle" tire, known as a highway tire, the wires or cables of the triangulation ply (20) and the second working ply (22) are the widest of the reinforcement (2) and the radial distances between the respective wires or cables of the two plies at the level of their edges are at most equal to 1.5 mm over an axial distance l at least equal to 2% of the axial width $L_0$ of the triangulation ply.

2 Claims, 1 Drawing Sheet

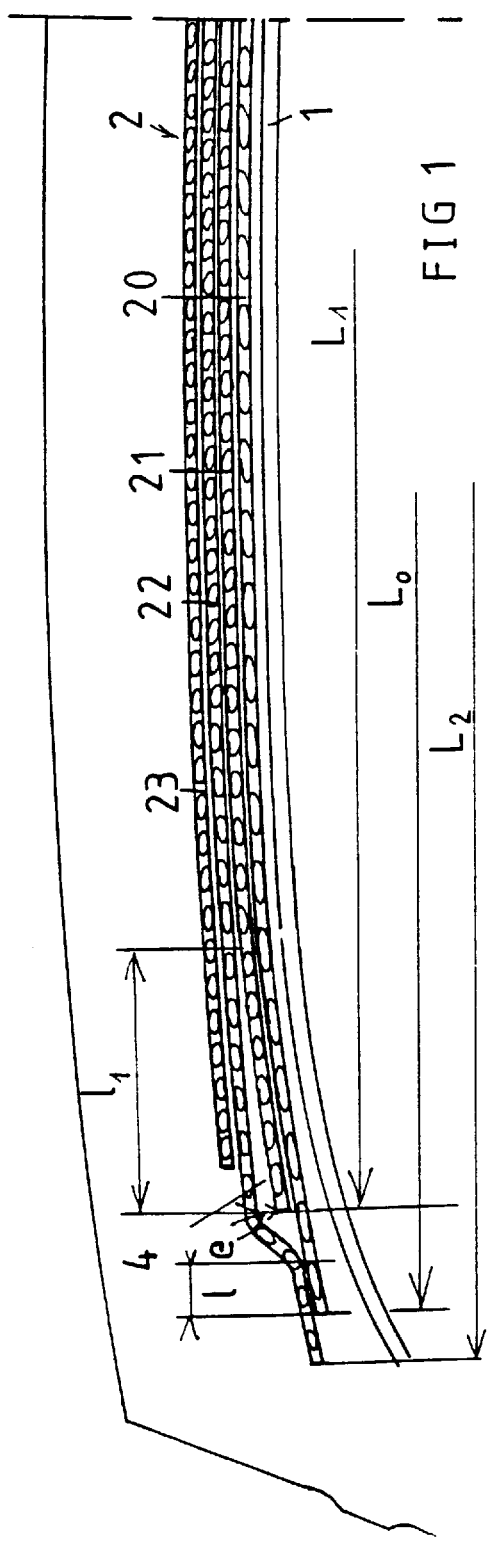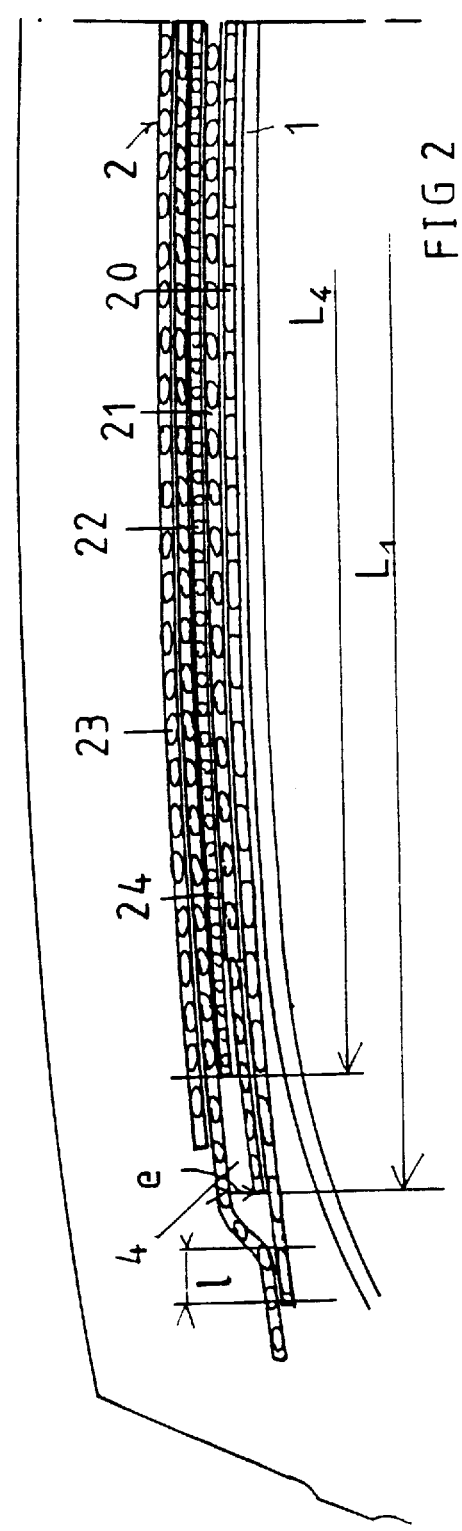

5,772,810

RADIAL TIRE WITH TRIANGULATED CROWN REINFORCEMENT

BACKGROUND OF THE INVENTION

The present invention relates to a tire with radial carcass reinforcement anchored on both sides to at least one bead wire and having a crown reinforcement consisting of at least two so-called working plies which are superimposed and formed of wires or cables which are parallel in each ply and crossed from one ply to the next, forming angles of at most 45° in absolute value with the circumferential direction of the tire.

Such a tire, more particularly of the "heavy vehicle" type, having a form ratio H/S of at most 0.80 and intended for a vehicle of medium or large tonnage, has a crown reinforcement which also comprises a ply of metal wires of cables of low stretchability which form an angle of between 60° and 90° with the circumferential direction, said ply, known as a triangulation ply, being located radially between the carcass reinforcement and the first crown ply known as working ply. The triangulation ply forms with the two working plies a triangulated reinforcement which exhibits little deformation under the various stresses which it suffers, the triangulation ply having the essential role of taking up the forces of transverse compression to which all the reinforcements are subjected in the region of the crown of the tire.

Certain existing tires, known as "highway" tires, are intended to travel at high speed over increasingly long distances due to the improvement in the network of highways and the increase in the highway networks throughout the world. The conditions under which such a tire is called upon to travel undoubtedly permit an increase in the number of miles traveled, there being less wear of the tire; on the other hand, the life of the tire and in particular of the crown reinforcement is strongly penalized.

The stresses present at the level of the crown reinforcement and, more particularly, the shear stresses between the two crown working plies, together with a substantial increase in the operating temperature at the level of the ends of the shorter working ply, result in the appearance and propagation of cracks in the rubber at the level of said ends, despite the presence at the junction of the edges of the working crown plies of a thickened layer of rubber.

SUMMARY OF THE INVENTION

In order to overcome the above drawbacks and to lengthen the life of the crown reinforcement of the type of tire in question, the tire, in accordance with the invention, comprises a radial carcass reinforcement surmounted by a crown reinforcement formed, in direction radially from the inside to the outside, of at least one triangulation ply of non-stretchable metal wires or cables which form an angle of between 60° and 90° with the circumferential direction and of two working plies formed of non-stretchable metal wires or cables crossed from one ply to the next and forming an angle of between 10° and 45° with the circumferential direction. It is characterized by the fact that the first working ply radially adjacent on the outside of the radially outermost triangulation ply is of a smaller width than the width of said triangulation ply, the second working ply, radially above the first, having a larger axial width than the width of the triangulation ply; and the edges of the said second working ply covering the edges of said triangulation ply so the radial distances between the respective cables of the two plies at the level of said edges are at most equal to 1.5 mm over an axial distance equal to at least 2% of the axial width of the triangulation ply.

By radial distance between two respective cables of the two plies there is understood the thickness of rubber measured radially between the upper and lower generatrices respectively of said cables.

A variant of the invention which is particularly beneficial for the life of the crown reinforcement consists in associating a ply of circumferential metal elements with the above architecture, said ply having an axial width of less than the width of the first working ply and located radially between the two working plies.

DESCRIPTION OF THE DRAWINGS

The characteristics and advantages of the invention will be better understood from the following description read with reference to the drawing which shows several embodiments by way of illustration and not of limitation, in which:

FIG. 1 shows diagrammatically, in meridian section, a first variant of a crown reinforcement in accordance with the invention, and FIG. 2 shows diagrammatically a second variant of a crown reinforcement.

DESCRIPTION OF PREFERRED EMBODIMENTS

In FIG. 1 the crown reinforcement 2 of a tire, of size 495/45 R 22.5, is arranged radially on top of a carcass reinforcement 1 formed of a single ply of non-stretchable metal cables. There are understood by non-stretchable cables, cables which, under a force equal to 10% of their rupture load have a relative elongation of at most 0.5%. The crown reinforcement 2 is formed, radially from the inside to the outside, of a triangulation ply 20 of non-stretchable metal cables which form an angle a of 65° with the circumferential direction of the tire. Said ply 20 has an axial width $L_0$ of 400 mm, said width being generally between 70% and 90% of the maximum axial width of the thickness center line of the carcass reinforcement 1 and substantially equal to the width of the tread of the tire (not shown). Radially above said triangulation ply 20 and adjacent it, the first working ply 21 formed of non-stretchable cables forming an angle β of 18° with the circumferential direction and having the same orientation as the angle of the cables of the triangulation ply has a width $L_1$ of 365 mm. The cables of the first working ply 21 and the cables of the triangulation ply 20, on the axial width common to the two plies, are separated radially from each other by a thin layer of rubber the thickness of which corresponds to twice the thickness of the rubber calendering layer of the ply, namely 0.8 mm. Radially above the first working ply 21 there is arranged the second working crown ply 22, formed of non-stretchable cables forming an angle γ equal to the angle β of 18° with the circumferential direction but of orientation opposite that of β. Said second working ply 22 is substantially wider than the first working ply 21 and wider than the triangulation ply 20, its width $L_2$ being equal to 415 mm. Between the two working crown plies 21 and 22 axially to the inside of each end of the second working ply 22 there is arranged a substantially triangular profiled member 4 of rubber mix having an axial width $l_1$ equal to 22 mm, namely 6% of the width $L_1$ of the working ply 21 ($l_1$ may be between 5% and 12% of the width $L_1$) and the thickness e of which at the level of the end of the second working ply is at least equal to 2 mm. Said profiled member is furthermore extended axially toward the outside and serves to fill the empty space created between a part of the second working ply 22 and the triangulation ply 20, said two plies being radially adjacent to each other and their cables being radially separated by a thin layer of rubber mix of a slight thickness equal to 0.8 mm, that is to say equal to the thickness of the layer separating the two working plies 21 and 22 over an axial width l of 8 mm.

The smaller width of the first working ply 21 and the coupling of the second working ply 22 with the triangulation ply 20 on the one hand by the smallest possible thickness of rubber and, on the other hand, over an axial width which is judiciously selected at the level of their respective edges, permits not only a decrease in the shear stresses between the two working plies at the level of their respective ends (which results in a decrease in the deformation by shear of the profiled member 4 by about 18%), but also, unexpectedly, a decrease in the operating temperature on the order of 12° C., said operating temperature being the highest temperature noted in the region of the edges of the crown of the tire (the hottest region) after travel under rated conditions of load and pressure. The gain in temperature can be explained not only by the decrease in the production of calories but also by the role as thermal drain played by the cables of the triangulation ply 20.

The variant crown reinforcement shown in FIG. 2 differs from the variant described previously by the presence between the two working crown plies 21 and 22 of an additional ply 24 formed of metal elements directed substantially parallel to the circumferential direction, the axial width $L_4$ of said ply being between 80% and 95% of the width $L_1$ of the first working ply 21 and its modulus of elasticity in tension being at most equal to the said modulus of elasticity intension of the most stretchable working ply.

Wires or cables oriented substantially parallel to the circumferential direction are wires or cables which form with said direction angles within the range of +2.5°, −2.5° from 0°.

A modulus of elasticity in tension of a ply of cables results from the tensile stress exerted in the direction of the cables that is necessary in order to obtain a given relative elongation e, said modulus being a tangent modulus. By modulus of elasticity of the additional ply at most equal to the modulus of elasticity of the most stretchable working ply, it is to be understood that the tangent modulus of the additional ply, whatever its relative elongation, is at most equal to the tangent modulus of the most stretchable working ply whatever its relative elongation, the most stretchable ply being the ply which, for each value of tensile stress has a relative elongation greater than that of the other ply for the same stress.

This second variant permits an additional decrease in the shear deformations and stresses between the ends of the two working plies 21 and 22.

The two crown reinforcements shown in FIGS. 1 and 2 are supplemented by a ply 23, known as the protection ply, formed of elastic cables, an elastic cable being a cable which has an elongation of more than 5% at the rupture force.

I claim:

1. A tire comprising a radial carcass reinforcement (1) surmounted by a crown reinforcement (2) formed, in direction radially from the inside to the outside, of at least one triangulation ply (20) of non-stretchable metal wires or cables which form an angle α of between 60° and 90° with the circumferential direction and of two working plies (21 and 22) formed of non-stretchable metal wires or cables crossed from one ply to the next and forming an angle β, γ of between 10° and 45° with the circumferential direction, characterized by the fact that the first working ply (21) which is radially adjacent on the outside of the radially outermost triangulation ply (20) has a width $L_1$ less than the width $L_0$ of said triangulation ply (20), the second working ply (22), which is radially above the first (21), having an axial width $L_2$ greater than the width $L_0$ of the triangulation ply (20), and the edges of said second working ply (22) covering the edges of said triangulation ply (20) so that the radial distances between the respective wires or cables of the two plies at the level of said edges are at most equal to 1.5 mm over an axial distance l at least equal to 2% of the axial width Lo of the triangulation ply (20).

2. A tire according to claim 1, characterized by the fact that at least one ply (24) of circumferential metallic elements is arranged radially between the two working plies (21 and 22), said ply (24) of circumferential metallic elements having an axial width $L_4$ less than the width $L_1$ of the first working ply (21) and its modulus of elasticity in tension being at most equal to the modulus of elasticity in tension of the most stretchable working ply.

\* \* \* \* \*